United States Patent [19]

Hung et al.

[11] Patent Number: 6,166,157
[45] Date of Patent: Dec. 26, 2000

[54] IODONITRILES AS CHAIN TRANSFER AGENTS IN THE MANUFACTURE OF PERFLUOROPOLYMERS

[75] Inventors: Ming-Hong Hung; Anestis Leonidas Logothetis; Zhen-Yu Yang, all of Wilmington, Del.

[73] Assignee: E. I. du Pont de Nemours and Company, Wilmington, Del.

[21] Appl. No.: 09/091,053

[22] PCT Filed: Dec. 12, 1996

[86] PCT No.: PCT/US96/19645

§ 371 Date: Jun. 10, 1998

§ 102(e) Date: Jun. 10, 1998

[87] PCT Pub. No.: WO97/22636

PCT Pub. Date: Jun. 26, 1997

Related U.S. Application Data

[60] Provisional application No. 60/008,951, Dec. 20, 1995.

[51] Int. Cl.$^7$ .............................. C08F 14/18; C08F 14/26
[52] U.S. Cl. ........................... 526/247; 526/206; 526/254
[58] Field of Search .................................. 526/247, 206, 526/254

[56] References Cited

U.S. PATENT DOCUMENTS

| | | | |
|---|---|---|---|
| 4,089,804 | 5/1978 | Falk et al. ................................. | 252/355 |
| 4,391,940 | 7/1983 | Kuhls et al. .............................. | 524/458 |
| 4,599,386 | 7/1986 | Carlson et al. ....................... | 525/326.2 |
| 4,948,853 | 8/1990 | Logothetis ............................... | 526/247 |
| 4,972,038 | 11/1990 | Logothetis ............................... | 526/247 |
| 4,983,697 | 1/1991 | Logothetis ............................... | 526/206 |
| 4,997,873 | 3/1991 | Suling et al. ............................ | 524/458 |
| 5,225,504 | 7/1993 | Tatsu et al. .............................. | 526/206 |
| 5,268,511 | 12/1993 | Farnham . | |
| 5,347,058 | 9/1994 | Farnham ................................. | 570/142 |
| 5,504,248 | 4/1996 | Krusic et al. ........................... | 562/849 |

FOREIGN PATENT DOCUMENTS

| | | | |
|---|---|---|---|
| 0 124 378 | 11/1984 | European Pat. Off. ...... | C08F 214/26 |
| 0 617 057 | 9/1994 | European Pat. Off. ........ | C08F 14/06 |

*Primary Examiner*—David W. Wu
*Assistant Examiner*—Tanya Zalukaeva

[57] ABSTRACT

Iodoperfluoroalkylnitriles are useful as chain transfer agents in the free radical polymerization of vinyl monomers to form perfluoropolymers. These nitrites provide end groups, which may take part in a cross-linking reaction, if desired, and also have a relatively low toxicity. The resulting perfluoropolymers are useful as molding resins and elastomers, particularly for parts where good chemical resistance and/or high temperature resistance are desirable.

17 Claims, No Drawings

IODONITRILES AS CHAIN TRANSFER AGENTS IN THE MANUFACTURE OF PERFLUOROPOLYMERS

This application claims benefit to U.S. provisional application No. 60/089,951 filed Dec. 20, 1995.

FIELD OF THE INVENTION

The use of fluorinated iodonitriles as chain transfer agents in the free radical polymerization of vinyl monomers to form perfluoropolymers is disclosed. Also disclosed is a process for making iodoperfluoroalkyl chlorosufates by the reaction of ICl, chlorosulfonic acid and selected perfluoroolefins.

TECHNICAL BACKGROUND

The free radical (catalyzed) polymerization of perfluorovinyl monomers to perfluorinated polymers (both plastics and elastomers) is a well known process, see for instance U.S. Pat. Nos. 3,132,123, 3,467,638, 3,682,872, 4,948,853, 4,973,634, and 4,983,697, and H. Mark., et al., Ed., Encyclopedia of Polymer Science and Engineering, 2nd. Ed., Vol. 16, John Wiley & Sons, New York, 1989, p. 577–648, which are all hereby included by reference. In such a polymerization the monomer(s) is (are) contacted with a free radical initiator and the polymerization is allowed to proceed. Such polymerizations are often carried out in solution, aqueous suspension or emulsion, or by other means. Perfluorinated plastics are useful in many applications wherein high temperature resistance and/or good chemical resistance are important. Perfluoroelastomers are useful in similar applications wherein elastomeric properties are desired, as in various types of seals such as brings, chevron rings, shaft seals, and valve packing and washers.

In making these polymers for various applications it is often desirable to control the molecular weight, particularly to decrease the- molecular weight from that which would be obtained in the absence of chain transfer agents. Lower molecular weight polymers often are easier to process, i.e., form into useful shapes. If the polymer is to be crosslinked, it is preferred that any chain transfer agent that is used contain functional groups such that end groups of the polymers, which are mostly formed by a chain transfer reaction involving the chain transfer agent, contain functional groups which may act as crosslinking sites (sometimes also called curesites). By reacting the chain ends, crosslinked networks with better physical properties are often obtained.

One useful type of chain transfer agent in such polymerizations is fluorinated alkyl iodides, especially fluorinated alkyl diiodides. When an alkyl diiodide causes a chain transfer reaction to occur, both chain ends that form contain iodine, which may be used as a curesite to crosslink the polymer. However, these diiodides, and/or byproducts produced in their syntheses are often quite toxic, thereby requiring extra precautions (and expense) in their manufacture and use. Less toxic substitutes that perform the chain transfer function, and which provide curesites at chain ends, are therefore desirable. The use of such iodides as chain transfer agents is reported in U.S. Pat. Nos. 4,000,356, 4,243,770, 4,361,678, 4,948,852, 4,948,853, 4,973,633, 4,973,634, and 4,983,697. None of these patents describe the use of the chain transfer agents described herein.

A. V. Fokin, et al., Izy. Akad. Nauk. SSSR, Ser. Khim., vol. 35 (1985), p. 2298–2302, describe the preparation of β-haloperfluoroethane fluorosulfates in relatively low yield by the reaction of tetrafluoroethylene, a halogen, and fluorosulfonic acid. The use of chlorosulfonic acid is not described in this references.

U.S. Pat. No. 4,835,305 describes the preparation of iodo- and bromo-substituted perfluoropropyl fluorosulfates by the reaction of bromo- or iodofluorosulfonic acid and hexafluoropropene.

SUMMARY OF THE INVENTION

This invention concerns a process for the free radical polymerization of vinyl monomers to produce perfluoropolymers, wherein the improvement comprises, using as a chain transfer agent a compound of the formula $I_n R^1 CN$, wherein:

$R^1$ is perfluoroalkyl having 2 or 3 free valencies or perfluoroalkyl having 2 or 3 free valencies and containing one or more ether oxygen atoms;

n is 1 or 2;

and provided that when n is 1, $R^1$ has two free valencies, and when n is 2, $R^1$ has 3 free valencies.

This invention also concerns a process for the production of a compound, comprising, contacting an olefin of the formula $R^2 CF=CF_2$, ICl, and chlorosulfonic acid, at a temperature of about $-20°$ C. to about $+45°$ C., for a period of time sufficient to produce a compound of the formula $R^2 CFICF_2 OSO_2 Cl$, wherein $R^2$ is fluorine, or perfluoroallyl.

DETAILS OF THE INVENTION

In the polymerization process described herein, an iodoperfluoroalkyl-nitrile is used as a chain transfer agent in the free radical polymerization of vinyl monomers to perfluoropolymers. Thus the vinyl monomers themselves should, for the most part, be perfluorinated so as to produce a perfluoropolymer. It is preferred that the perfluoropolymer produced is a perfluoroelastomer. By a perfluoroelastomer is meant a polymer whose glass transition temperature and melting point (if any) are below about 35° C., preferably below about 25° C.

Useful monomers in this process include perfluoroolefins such as tetrafluoroethylene (TFE), hexafluoropropylene, perfluoro(2,2-dimethyldioxole), and perfluoro(alkyl vinyl ethers) wherein the alkyl group has 1 to 20, preferably 1 to 5, carbon atoms such as perfluoro(methyl vinyl ether) (PMVE), perfluoro(propyl vinyl ether), and $R^3(OR^4)_m OCF=CF_2$ wherein $R^3$ is perfluoroalkyl containing 1 to 20 carbon atoms, each $R^4$ is perfluoroalkylene containing 1 to 20 carbon atoms, and m is an integer of 1 to 5, and combinations thereof. A preferred polymer is an elastomeric copolymer of TFE and a perfluoro(alkyl vinyl ether), more preferably a copolymer of TFE and PMVE. Another preferred copolymer is a copolymer in which at least 40 mole percent of the repeat units are derived from TFE.

Elastomeric copolymers may also contain (preferably) small amounts (0.1 to 5 mole percent of the repeat units) of curesite monomers. Curesite monomers are polymerizable vinyl monomers that contain functional groups that act as curesites, i.e., take part in any subsequent crosslinking reactions. A preferred curesite monomer contains one or more nitrile groups. Such nitrile containing curesite monomers are disclosed in U.S. Pat. Nos. 3,561,186 and 4,281,092, which are hereby included by reference. A particularly preferred nitrile containing curesite monomer is perfluoro (8-cyano-5-methyl-3,6dioxa-1-octene) (8CNVE). All of these curesite monomers are useful in combination with the (co)polymers mentioned above.

The chain transfer agents disclosed herein are perfluorinated alkanes containing a nitrile group, one or two iodine atoms, and optionally one or more ether oxygen atoms. These compounds have the formula $I_nR^1CN$, wherein n and $R^1$ are as defined above. It is preferred that n is one. In that case $R^1$ has two free valencies. By a free valence is meant a bond to which either an iodine or the nitrile group is bound to a carbon atom. The nitrile group and the iodine atom(s) may be bound to the same or different carbon atoms. The preparation of iodonitriles containing one iodine atom is described in the Experiments herein, and analogous methods may be used to prepare similar compounds. Iodonitriles containing one or two iodine atoms can also be made by methods described in U.S. Pat. No. 5,504,248, which is hereby included by reference.

It is preferred that $R^1$ has 1 to about 50 carbon atoms, more preferably 2 to about 20 carbon atoms. Preferred groups for $R^1$ are $—(CF_2)_m—$ wherein is 1 to 20 especially preferably when m is 1 or 2, $CF_3CF<$, $CF_2<$ and $—CF_2CF(CF_3)OCF_2CF_2—$. Preferred iodoperfluoronitriles are $I(CF_2)_mCN$ wherein m is 1 to 20, especially when m is 1 or 2, $CF_3CFICF_2CN$, $CF_3CF(CN)I$, and $ICF_2CF(CF_3)OCF_2CF_2CN$.

Polymerizations using the above chain transfer agents may be run in any of many known ways. The polymerizations may be continuous, semi-batch or batch processes. They may be run as aqueous emulsions or suspensions, or organic solutions or suspensions. Typical amounts of monomers, free radical initiators, surfactants (if present), and monomers are used under the usual conditions under which these polymers are made.

When the iodoperfluoroalkylnitriles are used as chain transfer agents, and when chain transfer takes place, it is believed that one of the chain ends formed contains an iodine atom and the other chain contains a nitrile group (and may also contain an iodine atom if a diiodoperfluoroalkylnitrile is used). Both iodides and nitriles may take part in suitable crosslinking reactions, see for instance U.S. Pat. Nos. 4,983,697 and 5,447,993, which are hereby included by reference. Therefore, of course, the polymer formed in the polymerization process may be crosslinked.

Also disclosed herein is a process for the preparation of iodoperfluoroalkyl chlorosulfates by the reaction of a fluorinated olefin of the formula $R^2CF=CF_2$ with ICl and chlorosulfonic acid. $R^2$ is fluorine or perfluoroalkyl. It is preferred that $R^2$ is fluorine or trifluoromethyl.

In this process relatively inexpensive chlorosulfonic acid is used, and good yields of the desired product are obtained. However, the maximum temperature must be controlled or side reactions produce substantial amounts of other undesired products (see Comparative Example 1), thereby lowering the yield of the desired iodoperfluoroalkyl chlorosulfate. A lower useful temperature is about −20° C., preferably about −10° C., while a maximum useful temperature is about +45° C., preferably about +35° C. Above +45° C. the desired product will still be obtained, but in lower yield.

The molar ratio of the ingredients is not critical, but since (relatively) one mole each of the perfluoroolefin, ICl and chlorosulfonic acid are actually reacted, an approximate 1 to 1.5:1:1 to 1.2 ratio of ingredients is preferred to maximize use of each of them. In another preferred embodiment excess chlorosulfonic acid is used, the excess acting as a solvent for the reaction. An excess of the perfluoroolefin, particularly if it is a gas, may be used to ensure all of the ICl is used.

As in most chemical reactions agitation sufficient to mix the ingredients is also preferred. Since chlorosulfonic acid reacts with moisture, it is preferred to exclude moisture, and it is convenient to run the reaction under an inert gas blanket, such as under nitrogen. The desired product can be isolated by normal methods known to the artisan, such as by distillation.

The iodoperfluoroalkyl chlorosulfates are useful as intermediates in the preparation of perfluoroalkliodonitriles, which are described herein are useful as chain transfer agents in certain polymerizations.

In the Experiments and Examples, all pressures below atmospheric pressure are absolute pressures, while all pressures above atmospheric pressure are gauge pressures.

In the Experiments and Examples, the following abbreviations are used:

8CNVE—perfluoro(8-cyano-5methyl-3,6-dioxa-1-octene)

APS—ammonium persulfate

Diak® 7—triallyl isocyanurate available from E. I. du Pont de Nemours and Company, Wilmington, Del. U.S.A.

GC—gas chromatography

Krytox® 16350—polyperfluoropropylene oxide available from E. I. du Pont de Nemours and Company, Wilmington, Del. U.S.A.

Luperco® 101XL—2,5-dimethyl-2,5-di-t-butylperoxyhexane available from Pennwalt Corporation, Lucidol Division.

PMVE—perfluoro(methyl vinyl ether)

TFE—tetrafluoroethylene

TPT—OH—triphenyltin hydroxide

In the Examples, polymers were tested using the following ASTM tests:

Oscillating Disc Rheometer (ODR)—D2084

Mooney Scorch—D1646

Tensile Properties, O-rings—D1414

Compression Set, O-rings—D1414

EXPERIMENT 1

Preparation of 2-Iodo-1,1,2,2-tetrafluoroethyl Fluorosulfate ($ICF_2CF_2OSO_2F$)

Into a 1-liter pressure reactor was charged a mixture of iodine monochloride (162.5 g, 1.0 mol) and fluorosulfonic acid (110 g, 1.1 mol). The reactor was cooled and tetrafluoroethylene (120 g, 1.2 mol) was added. After the addition of TFE was complete, the reaction mixture was heated at 100° C. for 10 hr. The cooled mixture was then slowly poured into a large amount of ice with stirring. The lower layer was separated, washed with dilute $NaHSO_3$ solution and water and dried over $MgSO_4$. Distillation afforded the desired product as a clear liquid (215 g, 66% yield), bp. 87–88° C. $^{19}F$ NMR (188.24 MHz, $CDCl_3$): −85.4 (dt, J=8.4 Hz, J=5.2 Hz, 2F), −65.7 (t, J=5.2 Hz, 2F), +49.6 (t, J=8.3 Hz, 1F).

EXAMPLE 1

Preparation of 2-Iodo-1,1,2,2-tetrafluoroethyl Chlorosulfate ($ICF_2CF_2OSO_2Cl$)

Into a 1-liter pressure reactor was charged a mixture of iodine monochloride (390 g, 2.4 mol) and chlorosulfonic acid (490 g, 4.206 mol). The reactor was cooled and kept at 0–10° C. until 300 g of tetrafluoroethylene (3.0 mol) was added. After the addition of TFE was complete, the reaction mixture was held at 0–10° C. for 6 hr, at 25° C. for 2 hr and at 50° C. for 2 hr. The reaction mixture was then slowly poured into a large amount of ice with stirring, and worked up as described above. The desired product was obtained (610 g, 74% yield), bp. 62–64° C./6.7 kPa. $^{19}$F NMR (188.24 MHz, CDCl$_3$): −85.6 (t, J=4.5 Hz, 2F), −65.3 (t, J=4.5 Hz, 2F). Anal. Calcd. for C$_2$F$_4$ICLSO$_3$: C: 7.02, F: 22.19; Found: C: 7.19, F: 22.73.

EXPERIMENT 2

Preparation of Ethyl Iododifluoroacetate (ICF$_2$CO$_2$Et)

(a) From 2-iodo-1,1,2,2-tetrafluoroethyl chlorosulfate

A 500 mL flask was charged with sodium fluoride (18.9 g, 0.45 mol) and ethanol (200 mL) and cooled in an ice-water bath. 2-Iodo-1,1,2,2-tetrafluoro-ethyl chlorosulfate (103 g, 0.3 mol) was added slowly. The reaction was exothermic and the reaction temperature was maintained at 20–30° C. After addition, the reaction mixture was stirred at room temperature for 10 hr and then poured into cold water. Ether was added to extract the product. The organic layer was washed with saturated NaCl solution and dried over MgSO$_4$. Evaporation of the solvent in vacuo followed by distillation gave the ethyl iododifluoroacetate (68.1 g, 91% yield), bp. 57–58° C./4.0 kPa. $^1$H NMR (300 MHz, CDCl$_3$): δ1.35 (t, J=7.0 Hz, 3H), 4.37 (q, J=7.0 Hz, 2H). $^{19}$F NMR (188.24 MHz, CDCl$_3$): −57.9 (s, 2F).

(b) From 2-iodo-1,1,2,2-tetrafluoroethyl fluorosulfate

Ethyl iododifluoroacetate (73.4 g, 74% yield) could also be prepared from 2-iodo-1,1,2,2-tetrafluoroethyl fluorosulfate (130.4 g, 0.4 mol), potassium fluoride (23.2 g, 0.4 mol) and ethanol (150 mL) according to the procedure described in Experiment (3a).

EXPERIMENT 3

Preparation of Iododifluoroacetamide (ICF$_2$CONH$_2$)

(a) From 2-iodo-1,1,2,2-tetrafluoroethyl chlorosulfate

Into a stirred solution of ammonium hydroxide (150 mL, 28–30% in aq.) and ether (150 mL) was added dropwise ICF$_2$CF$_2$OSO$_2$Cl (102.8 g, 0.3 mol) with external cooling. The temperature was maintained at 10–20° C. during the addition. After that, the mixture was warmed to room temperature and stirred for 30 min. The ethereal layer was separated and the aqueous layer was extracted with ether. The combined organic layer was washed with brine and dried over MgSO$_4$. Evaporation of the solvent followed by recrystallization from hexane/ether gave ICF$_2$CONH$_2$ (61.5 g, 92% yield) as a white solid, mp. 96–98° C. $^1$H NMR (300 MHz, acetone-d$_6$): δ7.35 (br, 1H), 7.81 (br, 1H). $^{19}$F NMR 188.24 MHz, 300 MHz, acetone-d$_6$): −57.5.

(b) From 2-iodo-1,1,2,2-tetrafluoroethyl fluorosulfate

Iododifluoroacetamide (28.5 g, 86%) could be prepared from ICF$_2$CF$_2$OSO$_2$F (48.9 g, 0.15 mol), ammonium hydroxide (80 mL, 28–30% in aq.) and ether (100 mL) in a similar way as described in Experiment (3a).

(c) From ethyl iododifluoroacetate

Ammonia gas was bubbled slowly into a stirred solution of ICF$_2$CO$_2$Et (62.5 g, 0.25 mol) and ether (150 mL) with ice water bath cooling. The reaction was monitored by GC for the complete conversion of the starting material. After usual the workup, ICF$_2$CONH$_2$ was obtained in almost quantitative yield (55 g).

EXPERIMENT 4

Preparation of Iododifluoroacetonitrile (ICF$_2$CN)

Iododifluoroacetamide (155 g, 0.7 mol) was well mixed with P$_2$O$_5$ (100 g, 0.704 mol) and heated at 150° C. in vacuo (about 20 kPa). The volatile was collected in a cold trap (dry ice-acetone bath). The heating oil bath temperature was increased slowly to 200° C. and the reaction was stopped until no more product was distilled off. Redistillation gave pure ICF$_2$CN (115 g, 81% yield), b.p. 52–54° C. $^{19}$F NMR (188.24 MHz, CDCl$_3$): −46.5. MS: Calcd. for [M$^+$]: 202.9116; Found: 202.9116.

EXPERIMENT 5

Preparation of I(CF$_2$CF$_2$)$_n$OSO$_2$F Oligomer

2-Iodo-1,1,2,2-tetrafluoroethyl fluorosulfate (65.2 g, 0.2 mol) was mixed with TFE (25 g, 0.25 mol) in a sealed stainless tube. The mixture was heated at 250° C. for 4 hr. The product was unloaded and subjected to fractional distillation. About 25 g (38.3 %) of the starting was recovered. Other oligomeric products (ca. 50 g) obtained were I(CF$_2$CF$_2$)$_2$OSO$_2$F, b.p. 42° C./3.3 kPa, I(CF$_2$CF$_2$)$_3$OSO$_2$F, b.p. 54° C./700 Pa, and higher boiling I(CF$_2$CF$_2$)$_n$OSO$_2$F (n>3). For I(CF$_2$CF$_2$)$_2$OSO$_2$F: $^{19}$F NMR (188.24 MHz, CDCl$_3$): −60.3 (t, J=13.8 Hz, 2F), −83.7 (d, J=7.2 Hz, 2F), −113.7 (s, 2F), −124.1 (t, J=12.4 Hz, 2F), +50 9 (m, br, 1F); Mass. Calcd. for [M$^+$]: 425.8471; Found: 425.8381. For I(CF$_2$CF$_2$)$_3$OSO$_2$F: $^{19}$F NMR (188.24 MHz, CDCl$_3$): −59.7 (m, 2F), −83.5 (m, 2F), −113.5 (m, 2F), −121.4 (m, 2F), −122.3 (m, 2F), −125.0 (m, 2F), +50 6 (t, J=8.2 Hz, 1F); Mass. Calcd. for [M$^+$]: 525.8407; Found: 525.8345.

EXPERIMENT 6

Preparation of 2-Iodohexafluoropropyl Fluorosulfate (CF$_3$CFICF$_2$OSO$_2$F)

Into a 1.3-liter stainless steel tube was charged a mixture of iodine monochloride (130 g, 0.80 mol) and fluorosulfonic acid (88 g, 0.88 mol). The tube was sealed and cooled, then hexafluoropropylene (144 g, 0.96 mol) was transferred into the tube. The reaction mixture was kept at 25° C. for 2 hr, 50° C. for 2 hr and 80° C. for 4 hr. The product was unloaded from the shaker tube and poured into ice water. The bottom organic layer was separated, washed with water and distilled to afford the title product (120 g, 40% yield) as a clear liquid, bp. 47° C./6.7 kPa. $^{19}$F NMR (188.24 MHz, CDCl$_3$): −74.5 (m, 3F), −77.0 (m, AB-pattern, 2F), −148.2 (m, 1F), +49.7 (m, 1F).

EXPERIMENT 7

Preparation of 2-Iodotetrafluoropropionamide (CF$_3$CFICONH$_2$)

Into a glass flask was placed a mixture of aqueous ammonium hydroxide (28 wt. %, 40.5 mL, 0.6 mol) and methylene chloride (80 mL) which was cooled to 10–15° C. 2-Iodohexafluoropropyl fluorosulfate from Experiment 5 (37.6 g, 0.1 mol) was added slowly with vigorous stirring while the reaction temperature was kept at <15° C. After addition, the mixture was warmed to ambient temperature, the bottom organic layer was separated, washed with aqueous sodium bisulfite solution, dried over MgSO$_4$. The solvent was removed in vacuo to give the title product as a white solid (18.5 g, 68.3 % yield), mp. 75–77° C., $^1$H NMR (300 MHz, CDCl$_3$): δ6.98, 6.53 (2 broad singlets); $^{19}$F NMR (188.24 MHz, CDCl$_3$): −76.3 (2 singlets, 3F), −138.5 (m, 1F); IR: 1690 cm$^{-1}$ (C=O); Anal. Calcd. for C$_3$H$_2$F$_4$INO: C: 13.30, H: 0.74, F: 28.05, N: 5.17. Found: C: 13.68, H: 0.83, F: 28.43, N: 5.21. Mass. Calcd. for [M$^+$]: 270.9117; Found: 270.9093.

EXPERIMENT 8

Preparation of 2-Iodotetrafluoropropionitrile (CF$_3$CFICN)

2-Iodotetrafluoropropionamide prepared from Experiment 6 (16.3 g, 0.06 mol) was mixed well with P$_2$O$_5$ (16.3 g, 0.115 mol) in a flask under nitrogen atmosphere. The mixture was heated slowly to 95 to 100° C., a volatile product started to form and was collected in a cold trap (dry ice-acetone bath). The title product was obtained as a slightly pink liquid after purification by distillation, yield 12.5 g (82.5%), b.p. 68–70° C. $^{19}$F NMR (188.24 MHz, CDCl$_3$): −78.7 (2 singlets, 3F), −137.9 (q, J =16 Hz, 1F); IR: 2288 cm$^{-1}$ (C≡N); Mass. Calcd. for [M$^+$]: 252.9382; Found: 252.9012.

EXPERIMENT 9

Preparation of 2-Iodotetrafluoropropanoamide

A 1 L autoclave was charged with 353 g iodine and 285 g of trifluoro-methoxylpentafluorocyclopropane and heated at 150° C. for 3 h and then 240° C. for 12 h. After the autoclave was cooled to room temperature, the reaction mixture was diluted with 1 L of ether and cooled to −78° C. Ammonia gas was added until the solution was basic. The reaction mixture was warmed to room temperature over 1.5 h. The mixture was poured into 1 L of ether and washed with water and dried over MgSO$_4$. After removal of the ether, 203.5 g of product was obtained. An analytical sample was obtained by recrystallization from hexane and ether, mp 136–137° C. $^{19}$F NMR: −62.3 (t, J=5 Hz, 2F), −112.1 (t, J=5 Hz, 2F). $^{1}$H NMR (Acetone-d6): 7.99 (br, 1H), 7.69 (br, 1H). IR (neat): 3375, 3267 (m), 3193 (m), 1708 (s), 1416 (s), 1180 (s), 1080 (s), 647 (s). Anal: Calcd for C$_3$H$_2$F$_4$NOI: C, 13.30; H, 0.74; F, 28.05; N, 5.17; I, 46.84. Found: C, 13.35; H, 0.78; F, 27.10; N, 4.81; 1, 46.87.

EXPERIMENT 10

Preparation of Iodotetrafluoropropanonitrile

A mixture of 150 g of fine powder of ICF$_2$CF$_2$CONH$_2$ and 235 g of P$_2$O$_5$ was heated at 130 to 150° C., during which time volatiles were distilled out. Final volatiles were collected in a −78° C. trap at 26.6 kPa. A total of 125.3 g of crude product was obtained, 95% pure by GC. Redistillation gave pure product, bp 60–61° C. $^{19}$F NMR: −63.3 (t, J=10.4 Hz, 2F), −100.5 (t, J=10.4 Hz, 2F). IR(neat): 2264 (w), 1235 (s), 1196 (s), 1172 (s), 1146 (s), 1089 (s), 1065 (s), 893 (s).

EXPERIMENT 11

Preparation of ICF$_2$CF(CF$_3$)OCF$_2$CF$_2$CONH$_2$

To a stirred solution of 22.5 g of ICP$_2$CF(CF$_3$) OCF$_2$CF$_2$CONH$_2$ and 30 mL of CH$_2$Cl$_2$ was added 3 g of NH$_3$ through a dry ice condenser which was at room temperature. After the addition was complete, the reaction mixture was stirred at room temperature overnight. After removal of volatiles, 21.6 g of ICF$_2$CF(CF$_3$) OCF$_2$CF$_2$CONH$_2$ were obtained. $^1$H NMR: 6.40 (br, 1H), 6.65 (br, 1H). $^{19}$F NMR: −58.3 (dm, J=212 Hz, 1H), −60.0 (dm, J=212 Hz, 1F), −76.7 (m, 3F), −82.1 (dm, J=139.5 Hz, 1F), −83.5 (dm, J=139 Hz, 1F), −123.1 (s, 13F), −134.1 (m, 1F). IR: 3413 (s), 1697 (s), 1230 (s).

EXPERIMENT 12

Preparation of ICF$_2$CF(CF$_3$)OCF$_2$CF$_2$CN

A mixture of 17.5 g of fine powder of ICF$_2$CF(CF$_3$) OCF$_2$CF$_2$CONH$_2$ and 17 g of P$_2$O$_5$ was heated at 150 to 200° C., during which volatiles were distilled out. Final volatiles were collected in a −78° C. trap at 13.3 kPa. A total of 13.8 g of ICF$_2$CF(CF$_3$)OCF$_2$CF$_2$CN were obtained, 95% pure by GC. $^{19}$F NMR: −58.6 (dm J=212.4 Hz, 1F), −60.1 (dm J=212 Hz, 1F), −76.7 (m, 3F), −83.3 (dm, J=135 Hz, 1F), −84.8 (dm, J=135 Hz, 1F), −108.6 (t, j=6.3 Hz, 2F), −133.6 (m, 1F). IR(neat): 2268 (m), 1113 (s).

EXAMPLE 2

Batch Polymerization: Into a 400 ml shaker tube were placed 200 ml of water, 7 g of perfluorooctanoic acid ammonium salt, 0.5 g of disodium hydrogen phosphate heptahydrate, 3 g of perfluoro-(8-cyano-5-methyl-3,6-dioxa-1-octene), 0.1 g of ammonium persulfate and 0.2 g of 1-iodo-2-cyano-perfluoroethylene. The shaker tube was cooled at −30 to −40° C., evacuated and 35 g of tetrafluoroethylene and 60 g of perfluoro(methyl vinyl ether) were condensed in the shaker tube. The tube was sealed and allowed to warm to 70° C. while shaking. The reaction was followed by pressure drop and after 4 h it was stopped. The polymer was isolated by adding the stable polymer emulsion to a 4 wt % solution of magnesium sulfate in water at 90° C. The polymer precipitated as crumb and it was washed with copious amounts of water before drying in an oven at 70° C. The polymer from four identical runs was combined and weighed 165 g. The properties are described in Table 1.

This polymer was compounded on a rubber mill using a dual cure system (peroxide, triallyl isocyanurate and triphenyl tin hydroxide, see U.S. Pat. No. 5,447,993) in the formulation shown in Table 1. O-Rings were pressed on a hydraulic press at 175° C. and 3.5 MPa pressure using a proper mold. The crosslinked parts were post-cured and the properties are shown in Table 1.

TABLE 1

TFE/PMVE/8CNVE TERPOLYMER MODIFIED WITH ICF$_2$CF$_2$CN

| POLYMER | |
|---|---|
| PMVE WT % | 37.4 |
| 8CNVE WT % | 1.6 |
| IODINE WT % | 0.14 |
| MELT INDEX, g/10 min | |
| 250° C. | 57.0 |
| 200° C. | 13.1 |
| Mooney Viscosity at 121° C. D1646 | <30 |
| Inherent Viscosity | .217 |
| FORMULATION | |
| POLYMER | 100 |
| MT BLACK | 10 |
| KRYTOX ® 16350 | 10 |
| LUPERCO ® 101XL | 2 |
| DIAK ® 7 | 2 |
| TPT-OH | 2 |
| ODR 177° C./3° ARC | |
| ML, Nm | .56 |
| ts$_2$ min | 1.5 |
| MH, Nm | 4.3 |
| MH-ML, Nm | 3.7 |
| TC70, min | 4 |
| PROPERTIES (O-rings)[1] | |
| M$_{100}$, MPa | 9.8 |
| Th, MPa | 17.0 |
| Eb, % | 173 |
| Comp. Set 204° C./70h | 29 |

[1]Samples were press-cured at 175° C./20 min and post-cured at 305° C. for 18 h under nitrogen

EXAMPLE 14

Continuous Polymerization: The polymerization process is essentially the same described in U.S. Pat. No. 4,983,697.

The polymer was prepared in a 2 L mechanically stirred, water jacketed, stainless-steel autoclave operated continuously at 90° C. and 6.2 MPa into which was pumped at a rate of 550 ml/h an aqueous polymerization medium/initiator solution comprising of 16 L of water, 55 g of ammonium persulfate, 471 g of disodium hydrogen phosphate heptahydrate, 283 g of ammonium pefluorooctanoate ("Fluorad" FC-143 from 3M Co.). At the same time a separate solution of perfluoro(8-cyano-5-methyl-3,6-dioxa-1-octene) (8CNVE), 6.2 g/h, and 1-iodo-2-cyanotetrafluoroethane, 0.2 g/h, were added. A gaseous stream of tetrafluoroethylene (113 g/h) and perfluoro(methyl vinyl ether) (PMVE, 130 g/h) were fed into the reactor at a constant rate by means of a diaphragm compressor. The polymer was continuously removed by means of a let-down valve and unreacted monomers were vented. The latex from 27.6 h was combined and the polymer was coagulated by adding into a hot (90–95° C.) magnesium sulfate heptahydrate solution of about 3700 g in 80 L of water. The coagulated crumb was repeatedly washed with fresh water and dried at 80° C. in an air oven. The polymer weighed approximately 3600 g. The properties of the polymer are shown in Table 2.

TABLE 2

$ICF_2CF_2CN$ MODIFIED TFE/PMVE/8CNVE - POLYMERIZATION

| Polymerization | | Results | |
|---|---|---|---|
| Temp. | 85° C. | PMVE conv. % | 60.6 |
| Pressure, MPa | 6.2 | PMVE % in polymer | 42.8 |
| PMVE/TFE Feed ratio | 1.15 | 8CNVE % in polymer | 2.2 |
| TFE + PMVE/8CNVE feed ratio | 34 | Iodine % in polymer | 0.02 |
| TFE + PMVE/APS | 258 | Mooney D1646 | |
| APS/$ICF_2CF_2CN$ | 3.75 | 121° C. | 68 |
| | | 150° C. | 24 |
| | | Melt Index at 250° C. g/10 min | 26.8 |
| | | Inh. visc. | 0.46 |

Milling, compounding and crosslinking was done using a dual system of peroxide/triallyl isocyanurate and triphenyl tin hydroxide (TPT-OH)(A), and also using a peroxide cure system (B). The compounding was done a standard rubber mill and O-rings were crosslinked by pressing them in a proper mold at 175° C./30 min under 3.5 MPa pressure. The physical properties are shown in Table 3.

TABLE 3

$ICF_2CF_2CN$ MODIFIED TFE/PMVE/8CNVE - PHYSICAL PROPERTIES

| | A (Dual Cure) | B (Peroxide) |
|---|---|---|
| Polymer | 100 | 100 |
| MT Black | 30 | 30 |
| Krytox ® 16350 | 10 | 10 |
| TPT-OH | 1 | — |
| Luperco ® 101 XL | 1 | 1 |
| Diak ® 7 | 1 | 1 |
| ZnO | 2 | 2 |
| ODR 190° C./3° Arc | | |
| Minimum, Nm | .56 | .56 |
| $ts_2$, min | 1.3 | 1.5 |
| MH, Nm | 4.1 | 2.6 |
| MH-ML, Nm | 3.6 | 2.0 |
| Mooney Scorch at 121° C. | | |

TABLE 3-continued $ICF_2CF_2CN$ MODIFIED TFE/PMVE/8CNVE - PHYSICAL PROPERTIES

| | A (Dual Cure) | B (Peroxide) |
|---|---|---|
| Minimum | 47 | 57 |
| 2 pt. rise, min | — | 8 |
| After 30 min | 47 | 64 |
| Tensiles (O-rings) | | |
| M50, MPa | 3.47 | 3.11 |
| M100, MPa | 6.72 | 6.85 |
| Tb, MPa | 9.83 | 11.7 |
| Eb, % | 148 | 154 |
| Compression set, 204° C./70 h | | |
| After post-cure | 38 | 42 |
| After Heat Age at 300° C./72 h | 57 | 75 |

EXAMPLE 15

Polymer was prepared as in Example 3, except 0.250 g/h of $ICF_2CF(CF_3)OCF_2CF_2CN$ was used as the chain transfer agent instead of 1-iodo-2-cyanotetrafluoroethane. The polymer properties are shown in Table 4.

Milling, compounding and crosslinking were done using a TPT cure (A in Table 5)and a dual TPT/peroxide cure (B in Table 5). The compounding was done on a rubber mill and O-rings were crosslinked by pressing them in a mold at 200° C./30 min and post-curing them at 305° C. under nitrogen for 42 h. Properties are shown in Table 5.

TABLE 4

| PMVE, conv. % | 59.6 |
|---|---|
| PMVE, wt. % in polymer | 43.2 |
| 8-CNVE, wt. % in polymer | 1.7 |
| Iodine, wt. % | 0.03 |
| inh. visc. | 0.50 |
| Mooney viscosity, 150° C. | 40 |

TABLE 5

| | A | B |
|---|---|---|
| Polymer | 100 | 100 |
| MT Black | 30 | 30 |
| Krytox 16350 | 10 | 10 |
| TPT | 2 | 2 |
| Diak 7 | 0.5 | 1 |
| Luperco 101XL | — | 1 |
| Tensiles (O-Rings) | | |
| M50, MPa | 2.6 | 2.6 |
| M100, MPa | 6.4 | 6.7 |
| TB, MPa | 10.5 | 12.2 |
| EB, % | 139 | 146 |
| Compression Set, 204° C./70 h | | |
| After Post-cure | 21 | 21 |
| After Heat-aging, 300° C., 72 h | | |

Comparative Example 1

Into a 100 ML stainless steel reactor was charged iodine monochloride (3.25 g, 0.02 mol) and chlorosulfonic acid (3.5 g, 0.03 mol). The reactor was cooled and evacuated, then tetrafluoroethylene (8 g, 0.08 mol) was transferred into the reactor. After being agitated and heated at 100–120° C. for 8 h, the product mixture was poured into ice water and the organic layer was separated. After drying with magnesium sulfate, the mixture was distilled to give three products: $ICF_2CF_2Cl$ (55% yield, bp. 55–58° C.), $ICF_2CF_2OSO_2Cl$ (21%, bp. 106° C.), and $(ClSO_2OCF_2CF_2OSO_2Cl)$ (5% yield, bp. 98° C./13.3 kPa).

Comparative Example 2

This experiment was carried out in a similar way as above example except that $I_2$ (5.08 g, 0.02 mol) was used instead of iodine monochloride. After the workup and distillation, three products in the following distribution was obtained: $ICF_2CF_2Cl$ (65% yield), $ICF_2CF_2OSO_2Cl$ (17%), and $(ClSO_2OCF_2CF_2OSO_2F)$ (<5% yield).

Comparative Example 3

Into a 400 mL stainless steel shaker tube was charged iodine (101.6 g, 0.4 mol) and chlorosulfonic acid (46.6 g, 0.4 mol). The reactor was cooled and evacuated, then tetrafluoroethylene (50 g, 0.8 mol) was transferred into the reactor. After being agitated and heated at 50° C. for 8 h, the product mixture was poured into ice water and the organic layer was separated. After drying with magnesium sulfate, the mixture was distilled to give low yield of $ICF_2CF_2OSO_2Cl$ (10 g), and a large amount of $ICF_2CF_2Cl$.

What is claimed is:

1. A process for the free radical polymerization of vinyl monomers to produce perfluoropolymers, wherein the improvement comprises, using as a chain transfer agent a compound of the formula $I_nR^1CN$, wherein:

$R^1$ is perfluoroalkyl having 2 or 3 free valencies or perfluoroalkyl having 2 or 3 free valencies and containing one or more ether oxygen atoms;

n is 1 or 2;

and provided that when n is 1, $R^1$ has two free valencies, and when n is 2, $R^1$ has 3 free valencies.

2. The process as recited in claim 1 wherein said perfluoropolymer is a perfluoroelastomer.

3. The process as recited in claim 1 wherein n is 1.

4. The process as recited in claim 2 wherein n is 1.

5. The process as recited in claim 1 wherein at least 40 mole percent of repeat units in said perfluoropolymer are derived from tetrafluoroethylene.

6. The process as recited in claim 4 wherein said fluoropolymer is a polymer of tetrafluoroethylene, hexafluoropropylene, perfluoro(2,2-dimethyl-dioxole), a perfluoro(alkyl vinyl ether) wherein the alkyl group has 1 to 20 carbon atoms, or $R^3(OR^4)_mOCF=CF_2$ wherein $R^3$ is perfluoroalkyl containing 1 to 20 carbon atoms, each $R^4$ is perfluoroalkylene containing 1 to 20 carbon atoms, and m is an integer of 1 to 5, and combinations thereof.

7. The process as recited in claim 4 wherein said fluoropolymer is a copolymer of a perfluoro(allyl vinyl ether) and tetrafluoroethylene, wherein said allyl group has 1 to 5 carbon atoms.

8. The process as recited in claim 4 wherein said fluoropolymer is a copolymer of perfluoro(methyl vinyl ether) and tetrafluoroethylene.

9. The process as recited in claim 4 wherein said polymer also contains a repeat unit containing a nitrile group.

10. The process as recited in claim 8 wherein said polymer also contains a repeat unit containing a nitrile group.

11. The process as recited in claim 10 wherein said repeat unit containing a nitrile group is derived from perfluoro(8-cyano-5-methyl-3,6-dioxa-1-octene).

12. The process as recited in claim 1 wherein said chain transfer agent is $I(CF_2)_mCN$ wherein m is 1 to 20, $CF_3CFICF_2CN$, $CF_3CF(CN)I$, or $ICF_2CF(CF_3)OCF_2CF_2CN$.

13. The process as recited in claim 10 wherein said chain transfer agent is $I(CF_2)_mCN$ wherein m is 1 to 20, $CF_3CFICF_2CN$, $CF_3CF(CN)I$, or $ICF_2CF(CF_3)OCF_2CF_2CN$.

14. The product of the process of claim 1.

15. The product of the process of claim 1 which is crosslinked.

16. The product of the process of claim 10.

17. The product of the process of claim 10 which is crosslinked.

* * * * *